(12) United States Patent
Gruszka de los Rios et al.

(10) Patent No.: US 11,744,258 B1
(45) Date of Patent: Sep. 5, 2023

(54) SMART FREEZER FOR ORGANIZING BREAST MILK STORAGE BAGS

(71) Applicant: PHILON LABS LLC, Aventura, FL (US)

(72) Inventors: David Gruszka de los Rios, Sunny Isles Beach, FL (US); Gilberto Antonio Román Balcone, Barcelona (VE); José Gerardo de Jesús Sánchez Marín, Lecheria (VE); Simón Antonio Díaz Abad, Barcelona (VE); Jósedavid Manzanares Arroyave, Puerto la Cruz (VE)

(73) Assignee: PHILON LABS LLC, Aventura, FL (US)

( * ) Notice: Subject to any disclaimer, the term of this patent is extended or adjusted under 35 U.S.C. 154(b) by 0 days.

(21) Appl. No.: 17/819,363

(22) Filed: Aug. 12, 2022

Related U.S. Application Data

(60) Provisional application No. 63/232,947, filed on Aug. 13, 2021.

(51) Int. Cl.
   *A23C 3/05* (2006.01)
   *A23C 9/20* (2006.01)

(52) U.S. Cl.
   CPC .............. *A23C 3/055* (2013.01); *A23C 9/206* (2013.01)

(58) Field of Classification Search
   CPC .......... A23C 3/055; A23C 9/206; F25D 25/04
   See application file for complete search history.

(56) References Cited

U.S. PATENT DOCUMENTS

| | | | | |
|---|---|---|---|---|
| 6,854,815 B1 * | 2/2005 | Smith | .................. | A47B 49/008 211/121 |
| 7,635,246 B2 * | 12/2009 | Neeper | .............. | G01N 35/0099 414/280 |

(Continued)

FOREIGN PATENT DOCUMENTS

| | | |
|---|---|---|
| CN | 104490231 | 4/2015 |
| CN | 104613701 | 5/2015 |

OTHER PUBLICATIONS

International Application No. PCT/US22/74892—Patent Cooperation Treaty PCT International Search Report—Completed Nov. 29, 2022 (dated Jan. 5, 2023).

(Continued)

*Primary Examiner* — Joseph F Trpisovsky
(74) *Attorney, Agent, or Firm* — LOTT & FISCHER, PL

(57) ABSTRACT

An apparatus and method for organizing breast milk storage bags, comprising a refrigerated enclosure, a vertical carousel automated conveyor having a plurality of racks rotating around it vertical axis with such racks partitioned in a plurality of compartments wherein the breast milk storage bags are placed, a main door that allows access to the whole arrangement and a secondary door that allows easy access to one rack for retrieving or storing breast milk storage bags, such secondary door includes a load sensor and a plurality of light sources that indicates in which slot the desired bag is located. The apparatus further includes a control panel with a User Interface and employs an algorithm that selects the breast milk storage bags according to the desired ounces sorting them by nearest expiration date and keeping track of the breast milk inventory database which is able to be accessed through a mobile app.

4 Claims, 14 Drawing Sheets

(56) References Cited

U.S. PATENT DOCUMENTS

2014/0145574 A1\*  5/2014  Henne ................... F25D 13/06
                                                         312/236
2016/0162715 A1   6/2016  Luk et al.

OTHER PUBLICATIONS

International Application No. PCT/US22/76792—Patent Cooperation Treaty PCT Written Opinion of the International Searching Authority—Completed Nov. 29, 2022 (dated Jan. 5, 2023).

\* cited by examiner

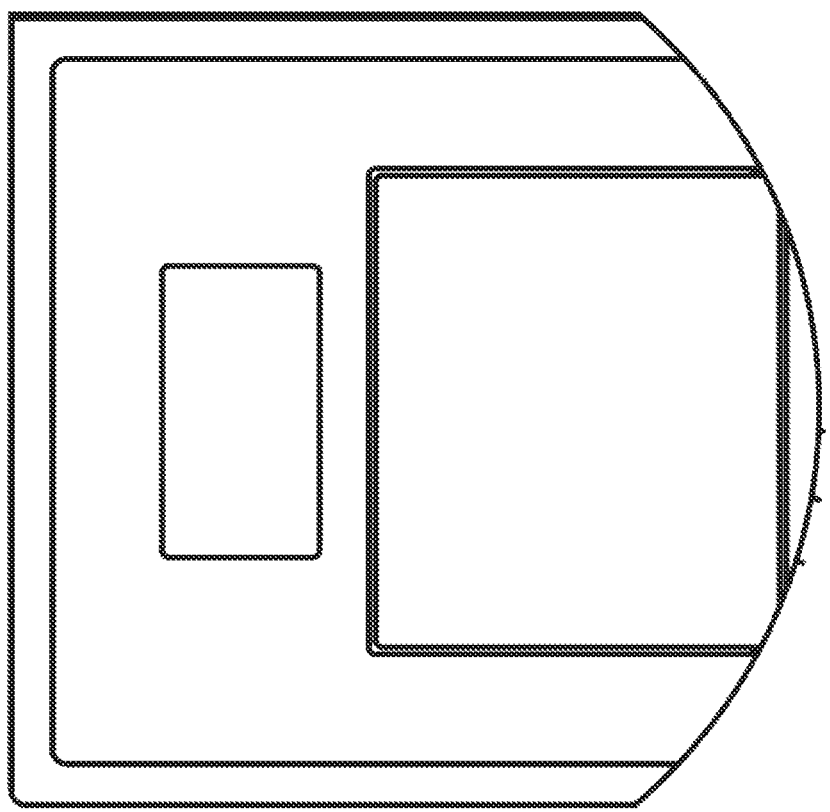
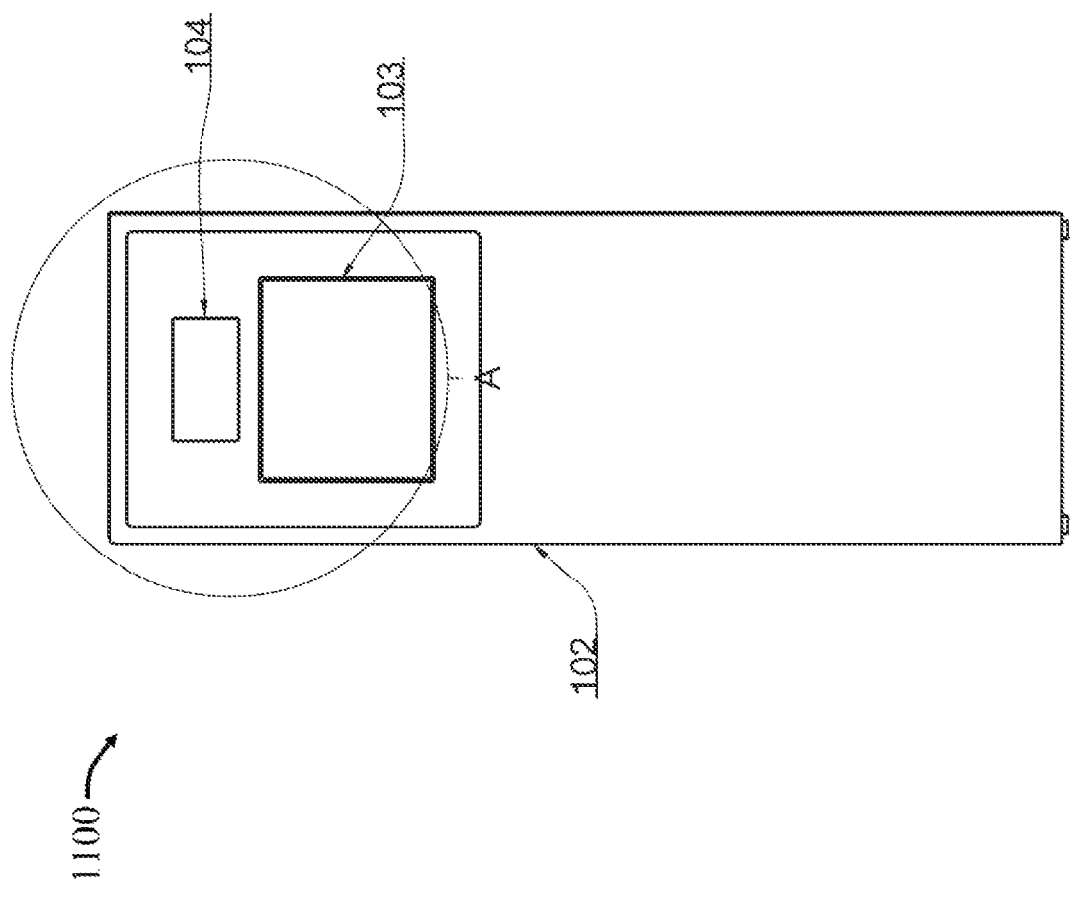
FIG. 11

SMART FREEZER FOR ORGANIZING BREAST MILK STORAGE BAGS

CLAIM OF PRIORITY

This application is being filed as a non-provisional patent application under 35 U.S.C. § 111(b) and 37 CFR § 1.53(c). This application claims priority under 35 U.S.C. § 111(e) to U.S. provisional patent application Ser. No. 63/232,947 filed on Aug. 13, 2021, the contents of which are incorporated herein by reference.

FIELD OF THE INVENTION

The present invention generally relates to the field of perishable food storage systems. More in particularly, but not exclusively, to an automated storage and retrieval system that freezes and organizes breast milk storage bags inside a refrigerated compartment.

BACKGROUND OF THE INVENTION

Breast milk provides the ideal nutrition for infants. It has a nearly perfect mix of vitamins, protein, and fat, and it's all provided in a form more easily digested than infant formula. Breast milk contains antibodies that help the infant fight off viruses and bacteria, it also lowers the risk of having asthma or allergies and overall hospitalizations and visits to the doctor.

In recent times, new trends have emerged to facilitate the task of breastfeeding and ensure the availability of breast milk whenever the infant needs it. Among these alternatives, the main method available to modern parents are milk banks, which consist of storing manually expressed breast milk in disposable bags in a general purpose freezer.

The main benefit of this method is to guarantee a permanent stock of breast milk for the infant, which allows the mother to comply with work, social and even medical commitments with the peace of mind that the infant will receive the valuable nutrients it needs for its proper growth.

However, this storage method means having to sacrifice a lot of freezer space and even, in most cases, it's necessary to acquire a dedicated freezer for only storing the breast milk bags. Each bag takes up an average of six ounces of breast milk, and can be kept frozen for up to four months. On average, a newborn consumes between 19 to 30 ounces of breast milk per day, which means that, for a week of breastfeeding, it is necessary to store more than 30 bags, an amount that takes up almost all of the freezer space of most consumer refrigerators.

Furthermore, each breast milk bag needs to be manually labeled with the date it was filled. This means that the user must spend time reviewing each bag until the desired number of ounces with the closest expiration date is found. This frustrating process can take several minutes, is time consuming for the user, draws attention from the infant, and wastes energy keeping the freezer open.

Currently, there are no commercial solutions that provide a smart storage system for breast milk bags, forcing millions of mothers and fathers around the world to devise improvised solutions to make it easier to organize the breast milk bags and cope with the frustrating process of sorting them manually.

Given this problem, there is a need for a smart freezer with an automated storage and retrieval organization system that facilitates the daily task of feeding the infant, providing a simple and fast interface that allows to select the amount of ounces of breast milk desired and carry a precise tracking of the available stock based on the breast milk bags closest to expiring, getting to a solution that involves not sacrificing refrigerator space, protecting breast milk bags from tearing, and being space and energy efficient.

SUMMARY OF THE INVENTION

The present invention is generally directed to an apparatus and method for organizing breast milk storage bags. More particularly, the design and implementation of a smart freezer with an automated storage and retrieval system is provided. The apparatus contains a refrigerated enclosure with a vertical carousel automated conveyor having a plurality of racks rotating around it vertical axis with such racks partitioned in a plurality of compartments wherein the breast milk storage bags are placed. An algorithm selects the breast milk storage bags according to the desired amount sorting them by the nearest expiration date and keeping track of the breast milk inventory.

The general design of the smart freezer and organizer apparatus will determine the efficacy of the invention and thus a basic statement of the main features and design attributes is warranted.

In one embodiment of the invention a smart freezer apparatus for organizing breast milk storage bags is provided, comprising a refrigerated enclosure able to reach freezing temperatures with a main insulated door that seals the refrigerated compartment, further including a vertical carousel type automated conveyor having a plurality of racks rotating around it vertical axis, with such plurality of racks partitioned in a plurality of compartments wherein the breast milk storage bags are placed in a vertical, horizontal or side position.

Furthermore, the invention optionally comprises a pivot mechanism with a pivot hub located offset from the center of mass on both lateral sides of the racks wherein a scissor links assembly is embedded and a guide link with a roller on it end is attached to the distal end of the hub.

The invention also optionally includes a drive mechanism on both lateral sides of the vertical carousel type automated conveyor comprising a set of drive roller chains wherein the scissors links are attached in specific links at a fixed distance, a set of driver sprockets connected through a shaft wherein the drive roller chains engages, a set of driven sprockets wherein the drive roller chains are supported and an electric motor with a reduction ratio assembly that powers the unit.

Moreover, the invention also optionally comprises a motion guide mechanism comprising a fixed track guide on both lateral sides of the vertical carousel type automated conveyor wherein the guide links engages preventing the racks to swing back and forth.

The invention also optionally includes a secondary insulated door located at the front face of the apparatus comprising a drop-down mechanism that allows limited access to the insides of the refrigerated enclosure, further including a load sensor for weighting the breast milk storage bags and a plurality of light sources that indicates in which rack's compartment the desired breast milk storage bag is located.

Also, the invention optionally comprises a built-in control panel with a Flat-Panel Display comprising a user interface for controlling the apparatus.

In another embodiment of the invention a smart freezer apparatus for organizing breast milk storage bags is provided, comprising a refrigerated enclosure able to reach freezing temperatures with a main insulated door that seals the refrigerated compartment, including a vertical carousel type automated conveyor having a plurality of racks rotating around it vertical axis, wherein the breast milk storage bags are stacked in a vertical, horizontal or side position.

The apparatus also optionally includes a pivot mechanism comprising a pivot hub located on the center of mass on at least one of the lateral sides of the racks wherein a scissor links assembly is embedded and at least one guide link with a roller on it end is attached to the distal end of the hub.

Moreover, the invention optionally comprises a drive mechanism on at least one of the lateral sides of the vertical carousel type automated conveyor comprising a set of drive roller chains wherein the scissors links are attached in specific links at a fixed distance, a set of driver sprockets connected through a shaft wherein the drive roller chains engage, a set of driven sprockets wherein the drive roller chains are supported and an electric motor with a reduction ratio assembly that powers the unit.

In addition, in this embodiment the invention optionally includes a motion guide mechanism comprising a fixed track guide on at least one of the lateral sides of the vertical carousel type automated conveyor wherein the guide links engages preventing the racks to swing back and forth.

This embodiment further optionally comprises a secondary insulated door located at the front, rear or lateral faces of the apparatus comprising a swing mechanism that allows limited access to the inside of the refrigerated enclosure, further including a load sensor for weighting the breast milk storage bags and a plurality of light sources that indicates in which rack's compartment the desired breast milk storage bag is located. The apparatus also includes, in this embodiment, a built-in control panel with a Flat-Panel Display comprising a user interface for controlling the apparatus with a touchscreen function.

In another embodiment of the invention, the apparatus comprises a sliding secondary insulated door. Also, in another embodiment of the invention provided is a built-in control panel with a display comprising a user interface for controlling the apparatus with a plurality of physical action buttons, or touch-enabled virtual buttons.

In another embodiment of the invention a protective window (transparent, semi-transparent, or opaque) that prevents the user from reaching inside the refrigerated enclosure when the vertical carousel automated conveyor is operating is provided. Conversely, in another embodiment of the invention a protective cover (transparent, semi-transparent, or opaque) for the plurality of compartments partitions in each rack is included.

Furthermore, in another aspect of the invention, a method for retrieving breast milk storage bags from the smart freezer apparatus is provided, comprising the steps (a) initializing the processor, sensors, controllers, compressor and motors of the apparatus, (b) user selecting to retrieve a breast milk storage bag from the control panel, (c) user indicating the desired ounces (d) selecting the desired breast milk storage bags according to the nearest expiration date (e) vertical carousel automated conveyor rotating until the rack that contains the desired breast milk storage bag is exposed to the secondary door, (f) notifying user that the secondary door can be opened, (g) activating the plurality of light sources indicating in which slot the desired breast milk storage bag is located, (h) waiting for user to close the secondary door as confirmation of breast milk storage bag retrieval, (i) evaluating if all breast milk storage bags where retrieved, (j) If not, repeating de process, (k) if yes, notifying the user the retrieval process is done, (l) finalizing the method.

In another aspect of the invention, a method for storing breast milk storage bags from the smart freezer apparatus is provided, comprising the steps (a) initializing the processor, sensors, controllers, compressor and motors of the apparatus, (b) user selecting from the control panel to storage a breast milk storage bag, (c) asking user if decides to manually input the ounces of the breast milk storage bag, (d) If yes, user proceeding to indicate how many ounces does the breast milk storage bag contains, (e) if not, placing the breast milk storage bag on the load sensor, (f) vertical carousel automated conveyor rotating until a rack that contains an empty slot is exposed to the secondary door, (g) notifying user that the secondary door can be opened, (h) turn on light sources indicating the empty slot where the desired breast milk storage bag can be placed, (i) waiting for user to close the secondary door as confirmation of breast milk storage bag being placed, (j) evaluating if all breast milk storage bags where stored, (k) if not, repeating de process, (l) if yes, notifying the user the storing process is done, (m) finalizing the method.

Finally, in another aspect of the invention, the disclosed apparatus further comprises one or more processors, sensors, drivers and controllers adapted to control the overall function of the electromechanical components of the apparatus, a memory adapted to store a data base of the breast milk storage bags inventory and consumption rates and the algorithm, a communication module that enables the data sharing between the apparatus and the built-in control panel or external devices, an algorithm that saves the location of each breast milk storage bag and selects them by ounce requirement sorting them by nearest expiration date and a user interface for directing the one or more processors, drivers and controllers to perform the breast milk storage bags storage or retrieval procedures in accordance with the preset instructions and the algorithm stored in the memory.

Additional details regarding the operation of the disclosed apparatus and method are included in the following description which includes non-limiting embodiments of certain aspects of the invention.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, which are schematic, and not to scale, wherein:

FIG. 11 is a frontal view of the smart freezer apparatus for organizing breast milk storage bags of FIG. 1 with a detailed inset view of the front control panel according to an embodiment of the present invention.

The following table provides, for ease of reference, a listing of all reference numbers shown in the accompanying figures and the corresponding elements.

Figure 1:
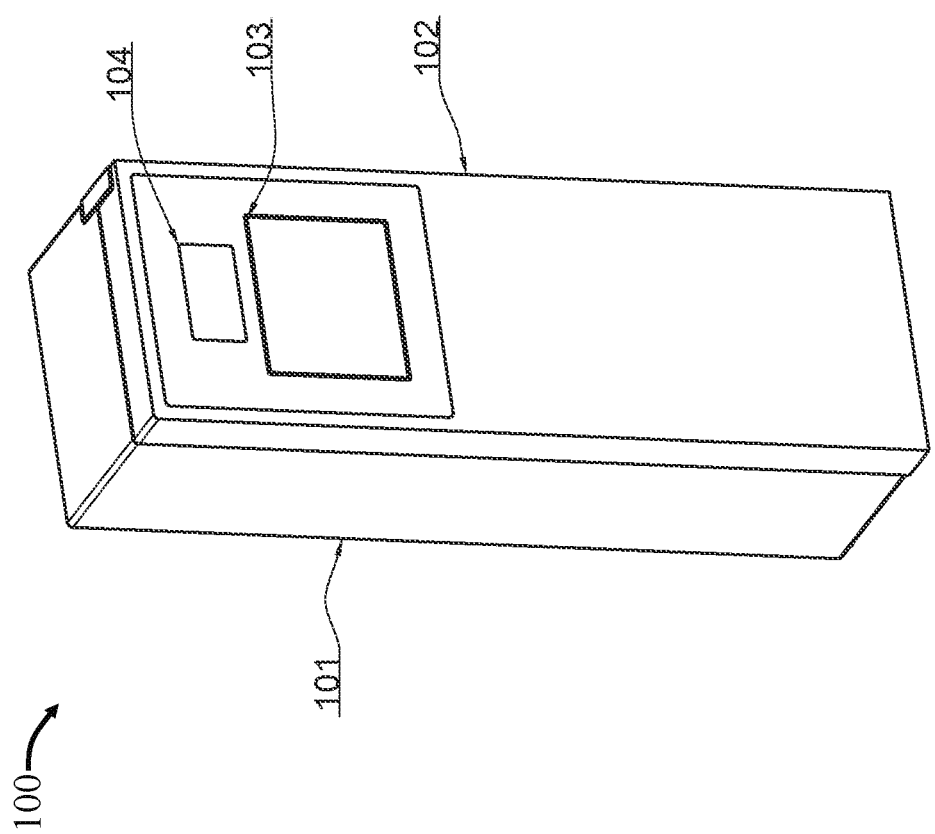
FIG. 1 is an isometric projection of the smart freezer apparatus for organizing breast milk storage bags according to an embodiment of the present invention.

| Element Description | Reference Number |
|---|---|
| Smart Freezer Apparatus for Organizing Breast Milk Storage Bags | 100 |
| Refrigerated enclosure | 101 |
| Main door | 102 |
| Secondary door | 103 |
| Control panel | 104 |
| vertical carousel type automated conveyor | 400 |
| Racks | 401 |
| Compartments | 402 |
| Pivot Hub | 501 |
| Scissors links assembly | 502 |
| Guide link | 503 |
| Breast milk storage bags | 601 |
| Drive roller chain | 701 |
| Reduction ratio assembly | 704 |
| Track guide | 705 |
| Spacers | 706 |
| Driven sprockets | 801 |
| Load sensor | 1001 |
| Light sources | 1002 |
| Retrieval method | 1200 |
| Retrieval method initialization | 1201 |
| Several motor, controllers and sensors | 1202 |
| Retrieval option selection | 1203 |
| Desired ounces input | 1204 |
| Algorithm selection | 1205 |
| vertical carousel automated conveyor rotation | 1206 |
| Secondary door opening | 1207 |
| Light sources activation | 1208 |
| Confirmation of breast milk storage bags retrieval | 1209 |
| Breast milk storage bags retrieval fully completed | 1210 |
| Notification of Breast milk storage bags completed | 1211 |
| Retrieval method finalization | 1212 |
| Storage method | 1300 |
| Storage method initialization | 1301 |
| Several motor, controllers and sensors | 1302 |
| Storage option selection | 1303 |
| Breast milk storage bag weighting | 1304 |
| Stored ounces input | 1305 |
| Bag placed on the load sensor | 1306 |
| vertical carousel automated conveyor rotation | 1307 |
| Secondary door opening | 1308 |
| Light sources activation | 1309 |
| Confirmation of breast milk storage bags storage | 1310 |
| Breast milk storage bags storage fully completed | 1311 |
| Notification of Breast milk bags storage completed | 1312 |
| Storage method finalization | 1313 |
| Control and communication method | 1400 |
| User | 1401 |
| User Interface | 1402 |
| Database | 1403 |

DETAILED DESCRIPTION OF THE INVENTION

This description illustrates certain aspects of the invention, and specific embodiments thereof, in greater detail. This description is not intended to be exhaustive, but rather to inform and teach the person of skill in the art who will come to appreciate more fully other aspects, equivalents, and possibilities presented by the invention. The scope of the invention is set forth in the claims, which alone limit its scope.

The embodiments are set forth in the following description and in the attached figures. One skilled in the art will understand that the present invention may be practiced without using all of the details described herein. Moreover, in the description that follows, it is understood that the figures related to the various embodiments are not to be interpreted as conveying any specific or relative physical dimension, and that specific or relative dimensions related to the various embodiments, if stated, are not to be considered limiting unless recited in the claims.

Provided is an electromechanical device that comprises an automated vertical carousel type storage and retrieval system operating inside a refrigerated enclosure able to reach freezing temperatures for organizing breast milk storage bags. The present invention is described in detail in the following examples, which may represent more than one embodiment of the invention. A main representation of the smart freezer apparatus for organizing breast milk storage bags is shown in FIGS. 1 and 2.

FIG. 1 is an isometric projection of the smart freezer apparatus for organizing breast milk storage bags 100 according to an embodiment of the present invention. In this representation, a refrigerated enclosure 101 able to reach freezing temperatures contains the rest of the electromechanical components, a main door 102 seals and isolates the inner refrigerated compartment while a secondary door 103 allows quick and easy access for the storage or retrieval procedures. The unit is controlled by the user through a front control panel 104 with a user interface.

Figure 2:
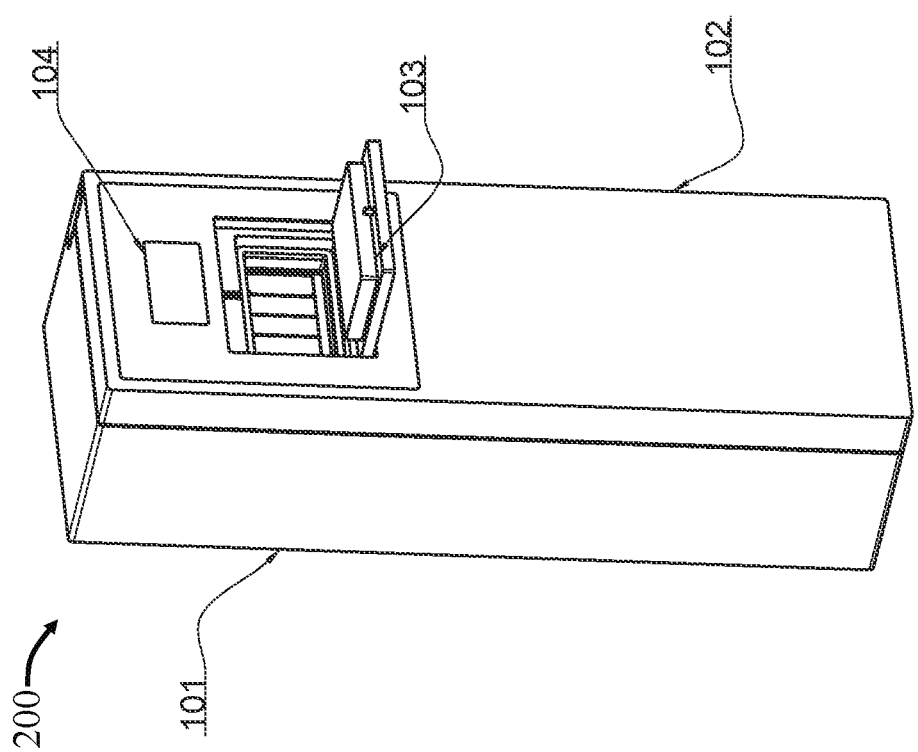
FIG. 2 is an isometric projection of the smart freezer apparatus for organizing breast milk storage bags with it secondary door open according to an embodiment of the present invention.

Subsequently, FIG. 2 is an isometric projection of the smart freezer apparatus for organizing breast milk storage bags 100 with it secondary door 103 open according to an embodiment of the present invention.

Figure 3:
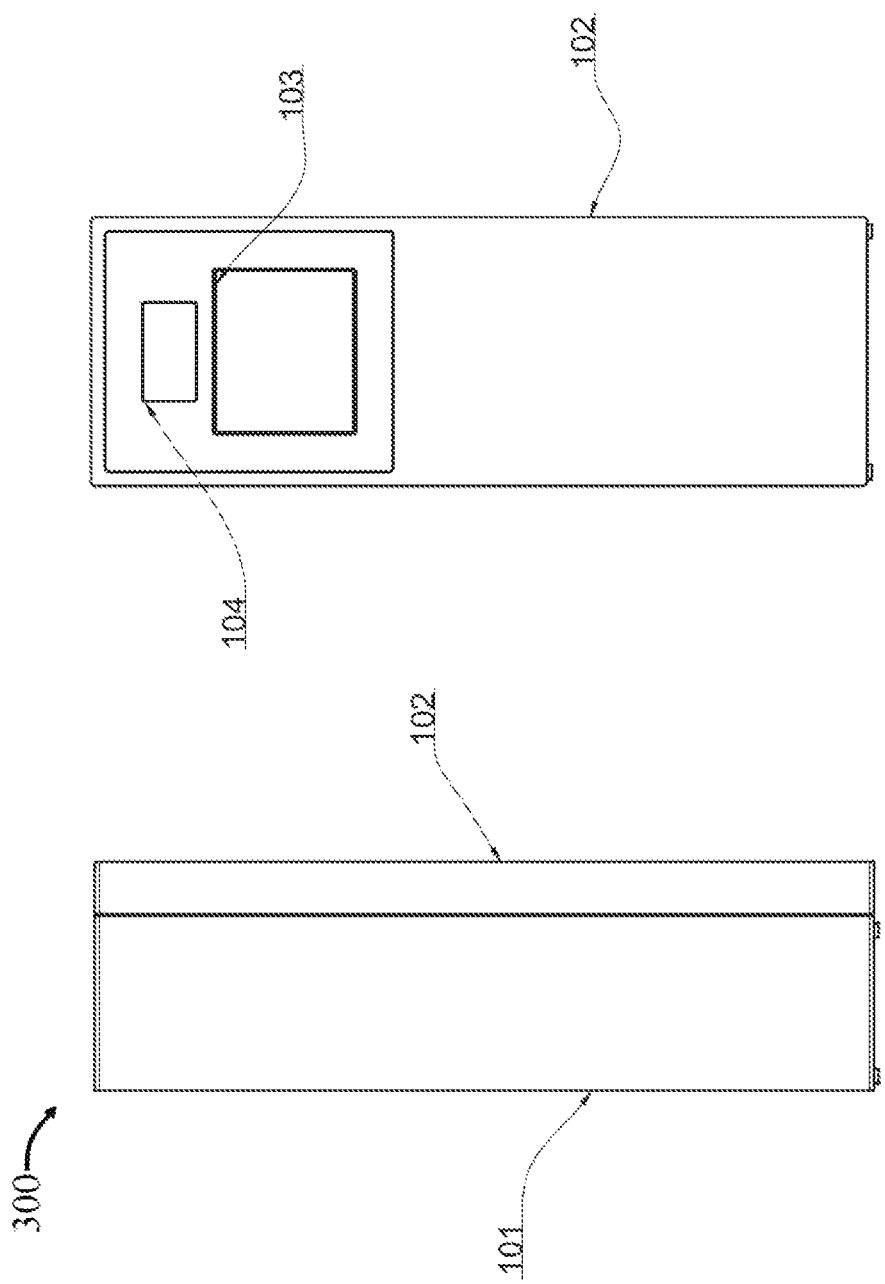
FIGS. 3A and 3B are, respectively, a side view and a front view of the smart freezer apparatus for organizing breast milk storage bags of FIG. 1 according to an embodiment of the present invention.

In another aspect of the invention, FIGS. 3A and 3B are, respectively, a side view and a front view of the smart freezer apparatus for organizing breast milk storage bags 100 of FIG. 1.

Figure 4:
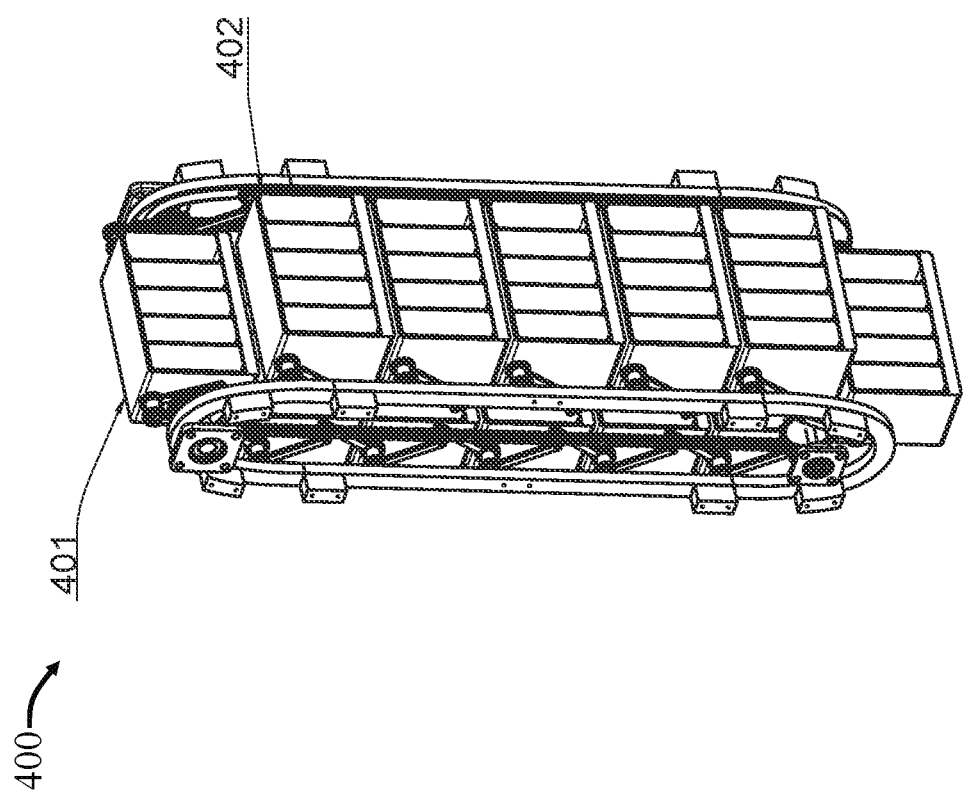
FIG. 4 is an isometric projection of the vertical carousel type automated conveyor located inside the smart freezer apparatus for organizing breast milk storage bags according to an embodiment of the present invention.

FIG. 4 is an isometric projection of the vertical carousel type automated conveyor 400 located inside the smart freezer apparatus for organizing breast milk storage bags 100. In this example of the invention, the conveyor comprises a plurality of racks 401 rotating around a vertical axis. Such racks are partitioned in a plurality of compartments 402 wherein the breast milk storage bags are placed in a vertical, horizontal or side position.

Figure 5:
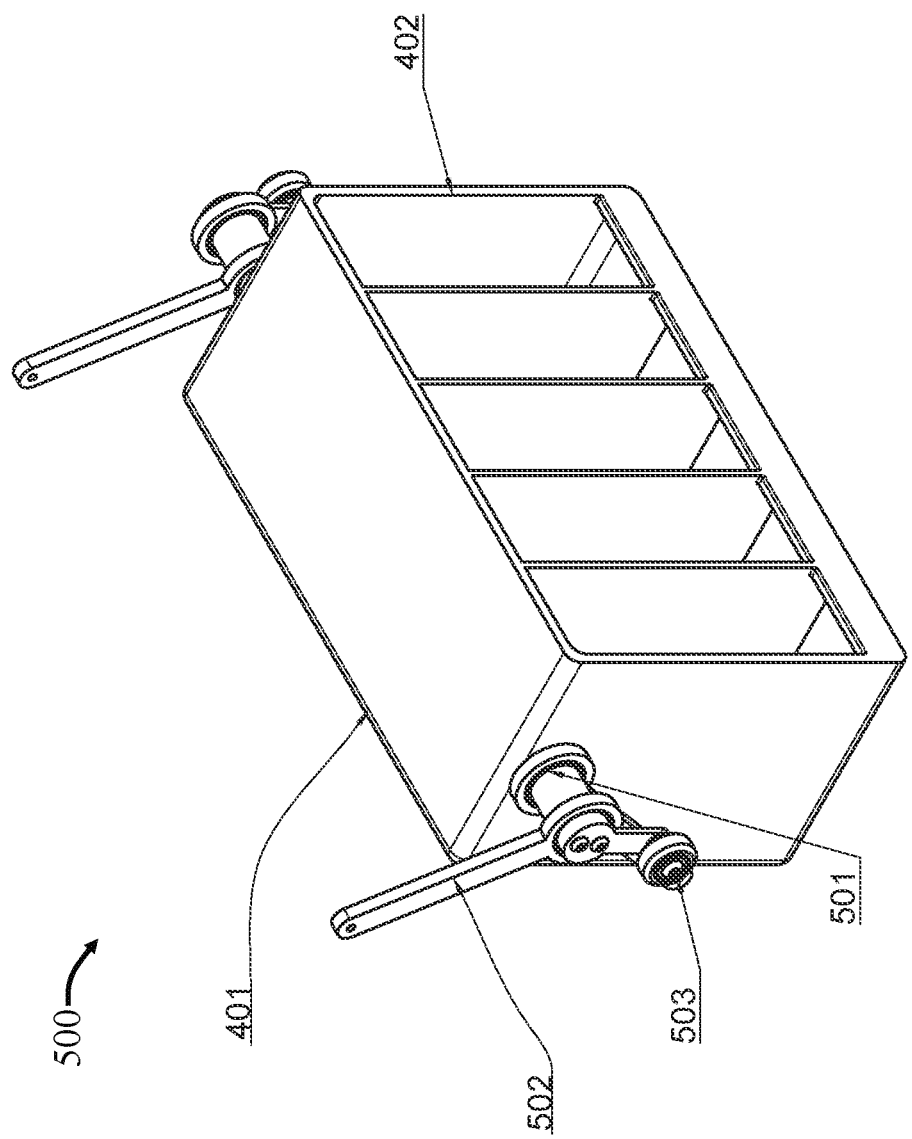
FIG. 5 is an isometric projection of the racks partitioned in a plurality of compartments wherein the breast milk storage bags are placed according to an embodiment of the present invention.

FIG. 5 is an isometric projection of a rack 401 partitioned in a plurality of compartments 402 wherein the breast milk storage bags are placed. According to this embodiment, the racks 401 incorporates a pivot hub 501, placed offset from the center of mass on both sides of the rack 401. In such pivot hubs a set of scissors links assembly 502 are embedded. Furthermore, it also comprises a guide link 503 with a roller attached to the distal end of the hub 501.

Figure 6:
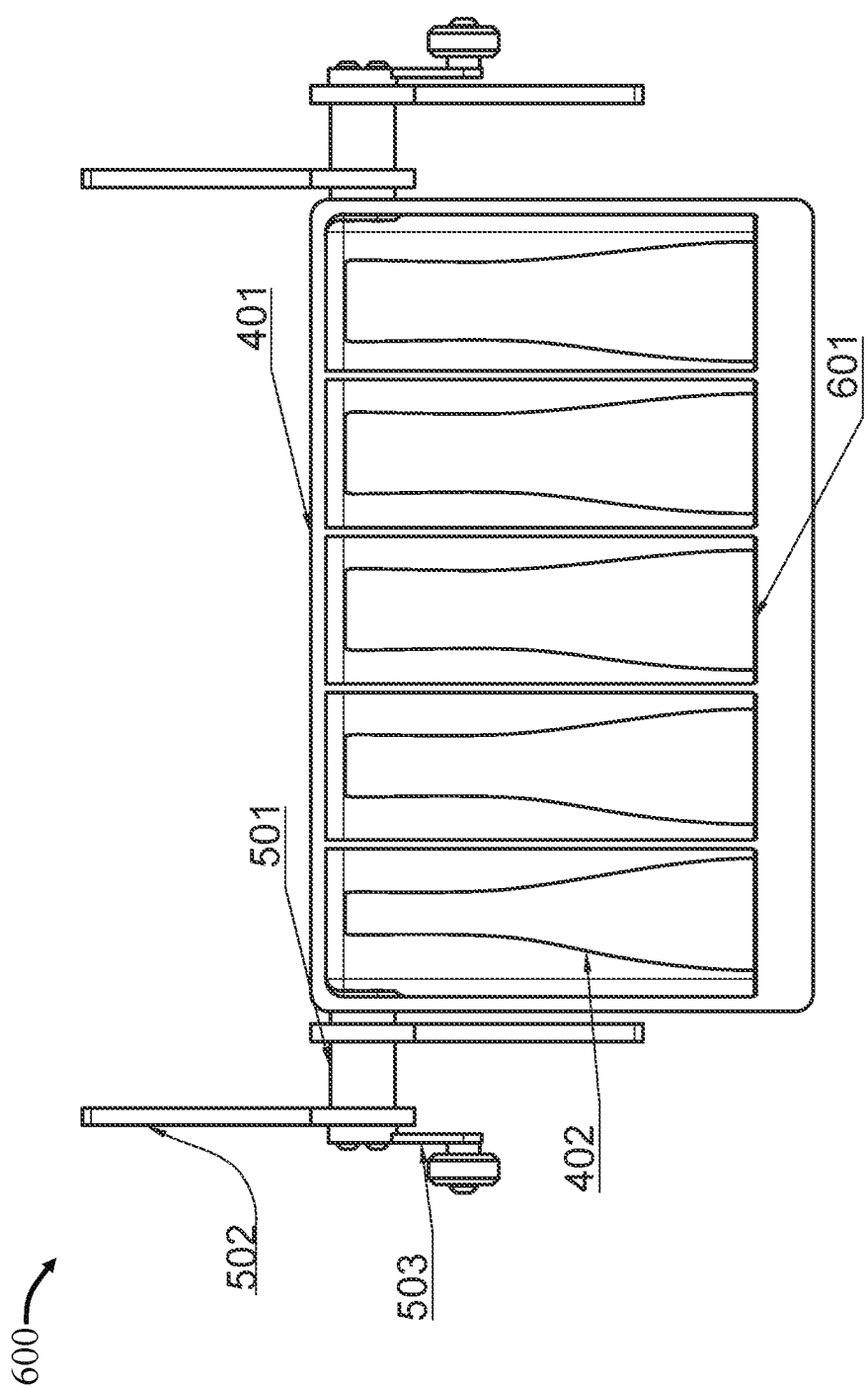
FIG. 6 is a front view of a singular rack with a plurality of compartments illustrating how the breast milk storage bags are placed according to an embodiment of the present invention.

FIG. 6 is a front view of a singular rack 401 with a plurality of compartments 402 illustrating how the breast milk storage bags 601 are placed, in accordance to an embodiment of the invention. In this embodiment of the invention, the breast milk storage bags 601 are shown placed in a vertical position. Also, this representation exposes the pivot hub 501 wherein the set of scissors links 502 are embedded and how the guide link 503 is attached to the distal end of the hub 501 for both lateral sides of the rack 401.

Figure 7:
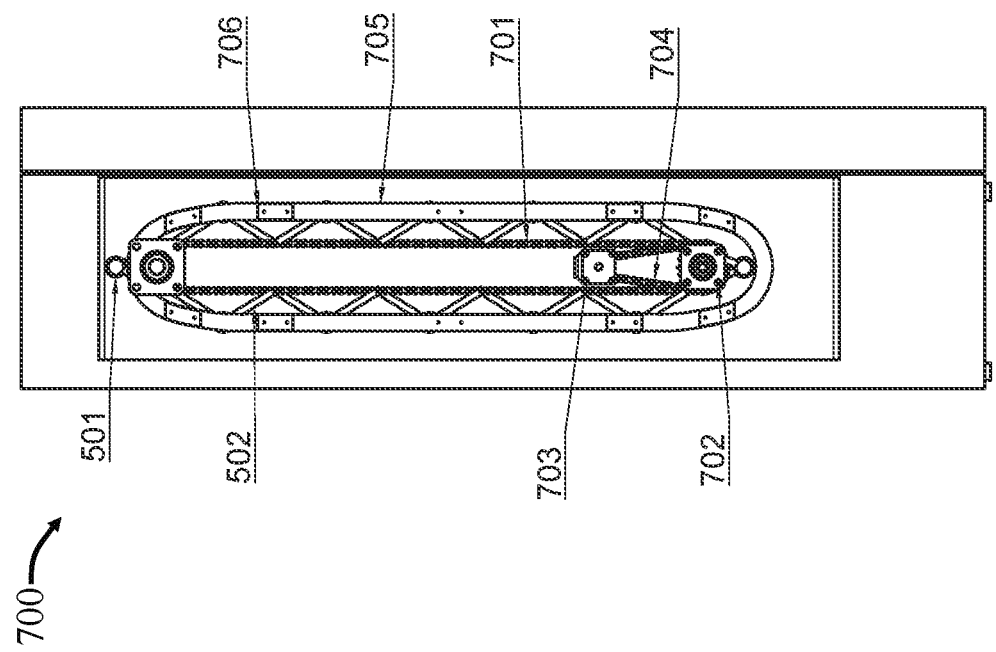
FIG. 7 is a side view of the vertical carousel type automated conveyor inside the smart freezer apparatus for organizing breast milk storage bags according to an embodiment of the present invention.

In another aspect of the invention, FIG. 7 is a side view of the vertical carousel type automated conveyor 400 inside the smart freezer apparatus for organizing breast milk storage bags 100, according to an embodiment of the present invention. In this example, the scissors links assembly 502 are connected to specific links of the drive roller chain 701 that engages into the driver sprockets 702 that imparts the rotating movement which are actuated by an electric motor 703 coupled with a reduction ratio assembly 704 for achieving the proper torque and speed of the conveyor. Also, one of the lateral side track guides 705 is shown with a plurality of spacers 706 that are attached to the inner wall of the refrigerated enclosure 101 by means of screws and other fasteners. The guide links 503 located on the distal end of the pivot hubs 501 engage into the lateral side track guides 705 preventing the racks 401 from swinging back and forth as they rotate around the vertical axis of the vertical carousel type automated conveyor 400.

Figure 8:
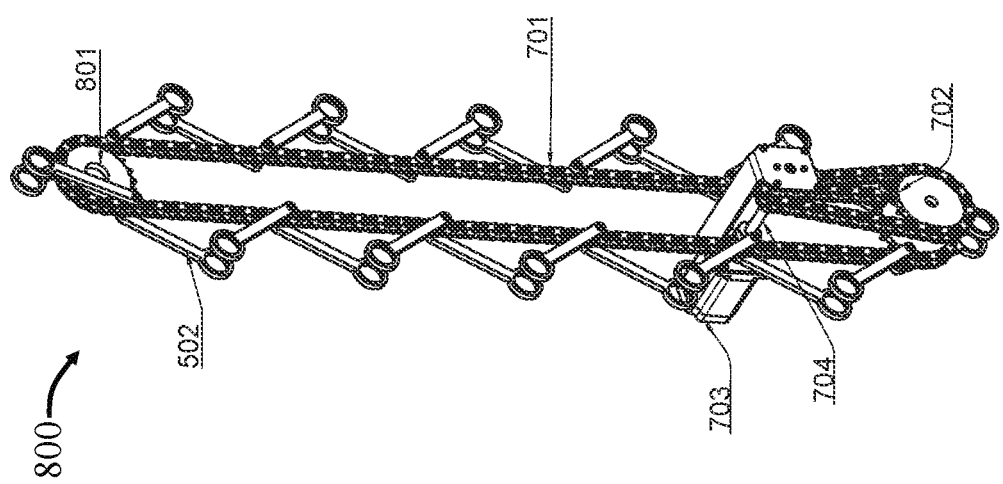
FIG. 8 is an isometric projection of the drive arrangement in one of the sides of the vertical carousel type automated conveyor according to an embodiment of the present invention.

FIG. 8 is an isometric projection of the drive arrangement in one of the sides of the vertical carousel type automated conveyor 400. In this embodiment, the scissors link assembly 502 of each rack 401 are connected to specific links of the drive roller chain 701 at a fixed distance which also engages into a set of driven sprockets 801 that act as supports and applies the proper tension.

Figure 9:
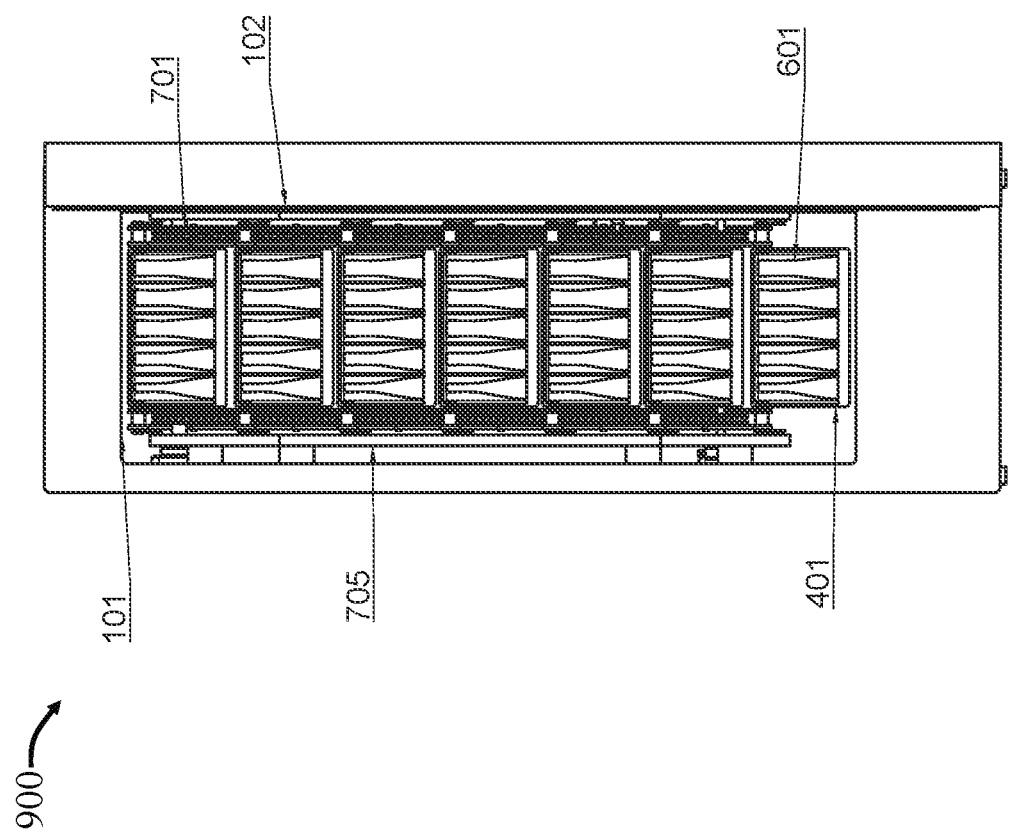
FIG. 9 is a front view of the smart freezer apparatus for organizing breast milk storage bags with the vertical carousel type automated conveyor arranged inside the refrigerated enclosure according to an embodiment of the present invention.

In another embodiment, FIG. 9 is a front view of the smart freezer apparatus for organizing breast milk storage bags 100 with the vertical carousel type automated conveyor 400 arranged inside the refrigerated enclosure 101.

Figure 10:
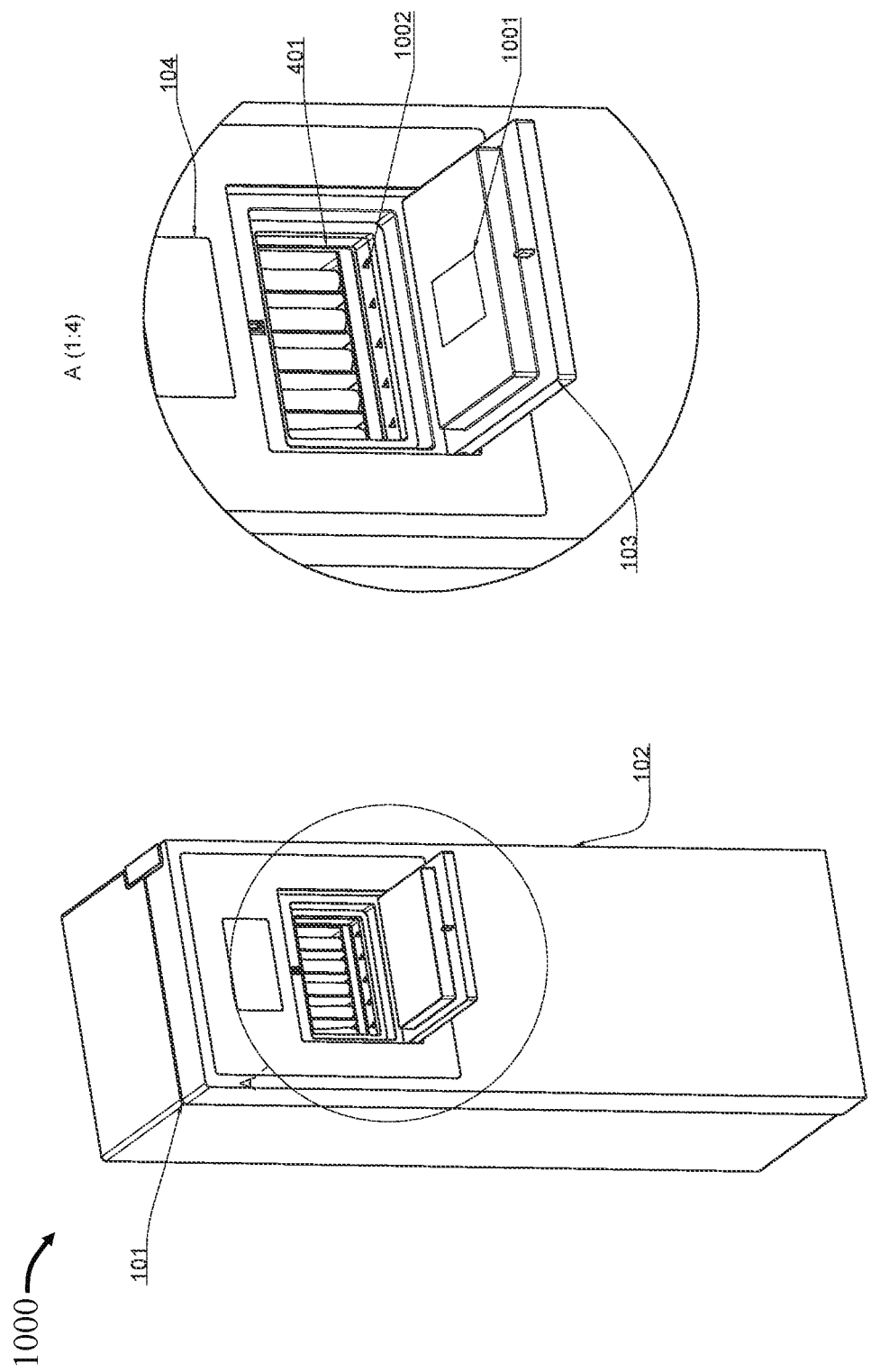
FIG. 10 is an isometric projection of the smart freezer apparatus for organizing breast milk storage bags of FIG. 2 with a detailed inset view of the secondary door open according to an embodiment of the present invention.

FIG. 10 is an isometric projection of the smart freezer apparatus for organizing breast milk storage bags 100 of FIG. 2 with a detailed view of the secondary door 103 wide open. In this representation, the secondary door 103 comprises a push-to-open drop down mechanism allowing the user to easy access the rack 401 wherein the desired breast milk storage bag 601 is located, the secondary door also comprises a load sensor 1001 that weights the breast milk storage bags 601 and a plurality of light sources 1002 that indicates the compartment 402 wherein the desired breast milk storage bag 601 is placed.

FIG. 11 is a frontal view of the smart freezer apparatus for organizing breast milk storage bags 100 of FIG. 1 with a detailed view of the front control panel 104, according to an embodiment of the present invention. In this example, a built-in flat-panel display (FPD) shows a User Interface (UI) that allows the user to control several parameters of the unit and to select and manage the storage or retrieval procedures.

Figure 12:
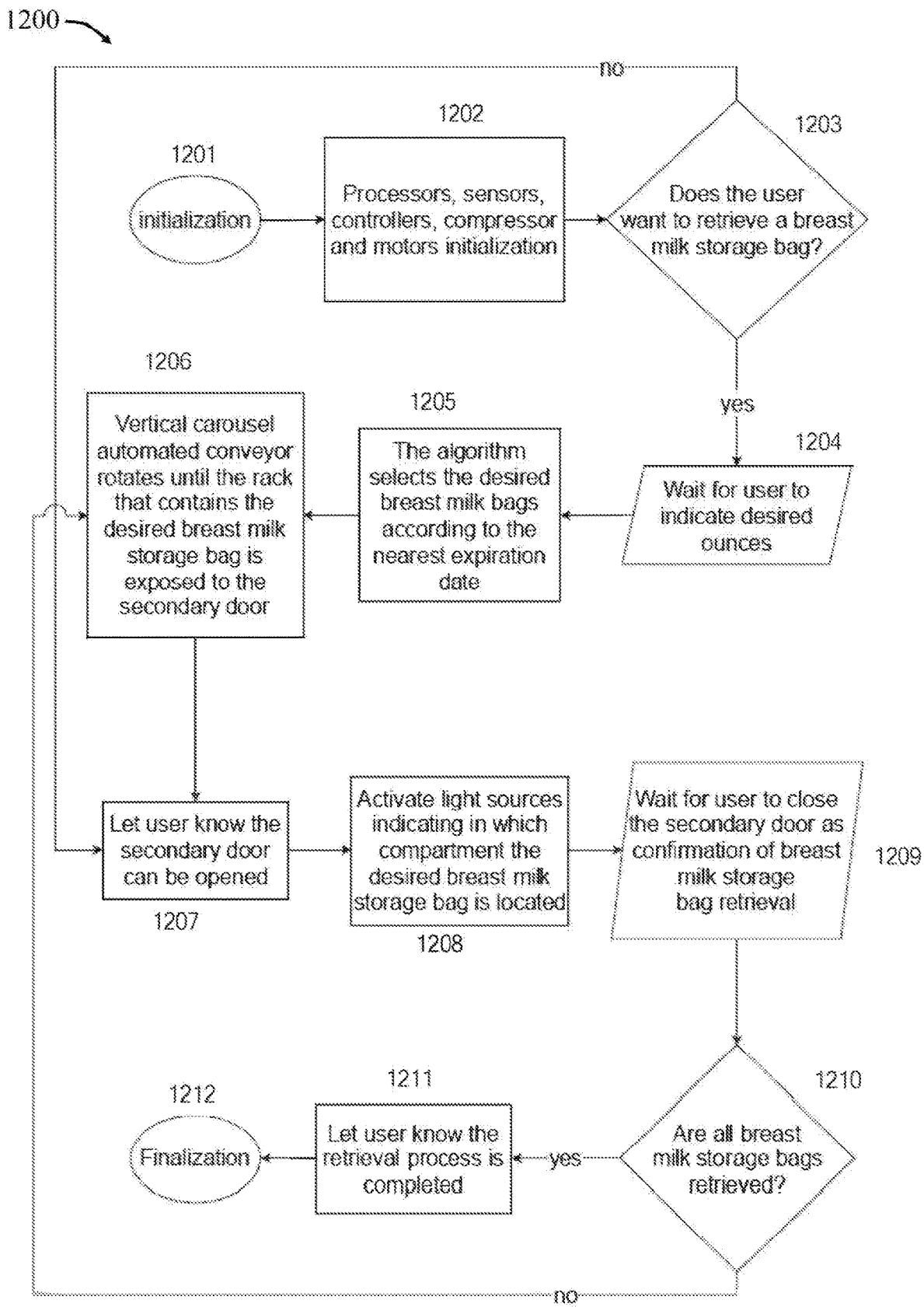
FIG. 12 is a process flow diagram illustrating the method for retrieving a breastmilk storage bag according to an embodiment of the present invention.

In another aspect of the invention, FIG. 12 is a process flow diagram illustrating the method for retrieving a breast-milk storage bag 601 according to an embodiment of the present invention. The method 1200 starts with the initialization 1201 of the several processors, sensors, controllers, compressors and motors 1202, next the user selects the breast milk storage bag 601 retrieve option 1203 indicating the desired ounces 1204 following by the algorithm selecting the desired breast milk storage bags 601 according to the nearest expiration date 1205 and the drive unit rotating the vertical carousel type automated conveyor 400 until the rack 401 that contains the desired breast milk storage bag 601 is exposed 1206 to the secondary door 103, the front control panel 104 notifies the user that the second door 103 can be opened 1207, meanwhile the light sources 1002 are activated 1208 indicating in which compartment 402 the desired breast milk storage bag 601 is located, next the user closes the secondary door 103 as confirmation of breast milk storage bag 601 retrieval 1209 and, after making sure that all the breast milk storage bags 601 where retrieved 1210, the front control panel 104 notifies the user that retrieval process is completed 1211, finalizing 1212 with the method.

Figure 13:
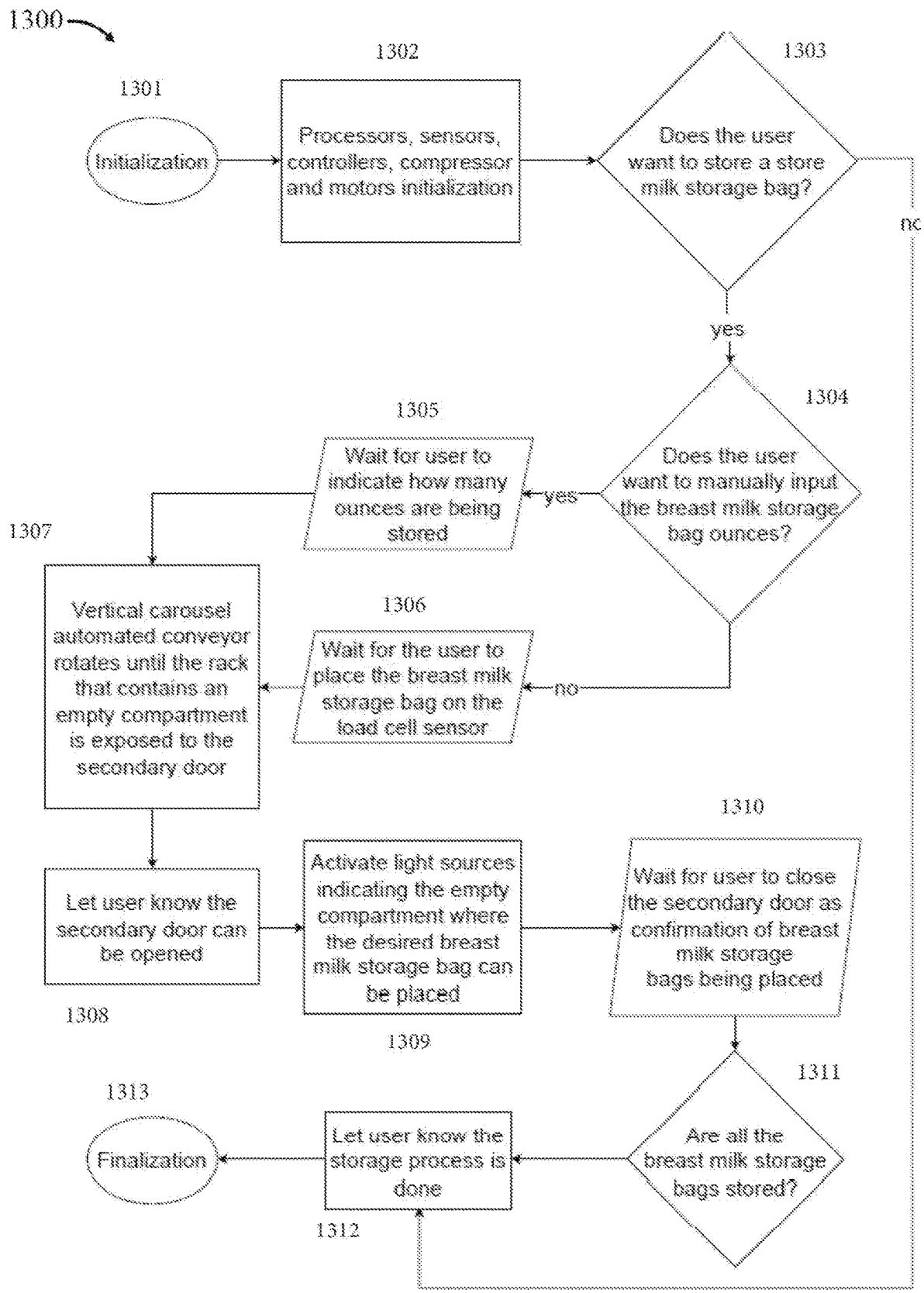
FIG. 13 is a process flow diagram of the method for storing a breast milk storage bag according to an embodiment of the present invention.

In another embodiment of the invention, FIG. 13 shows a process flow diagram of the method for storing a breast milk storage bag 601. The method 1300 starts with the initialization 1301 of the several processors, sensors, controllers, compressors and motors 1302, next the user selects the breast milk storage bag 601 storage option 1303 wherein the user decides to input the breast milk storage bags 601 filled ounces manually or by weighting the bag 1304, if yes, the user indicates how many ounces are being stored 1305, if not, the user places the breast milk storage bag 601 on the load sensor 1001 located on the secondary door 1306. After that process is completed, the vertical carousel type automated conveyor 400 rotates until a rack 401 that contains an empty compartment 402 is exposed 1307 to the secondary door 103, the front control panel 104 notifies the user that the second door 103 can be opened 1308, meanwhile the light sources 1002 are activated 1309 indicating in which compartment 402 the desired breast milk storage bag 601 can placed, next the user closes the secondary door 103 as confirmation of breast milk storage bag 601 being stored 1310 and, after making sure that all the breast milk storage bags 601 where stored 1311, the front control panel 104 notifies the user that storage procedure is completed 1312, finalizing 1313 with the method.

Figure 14:
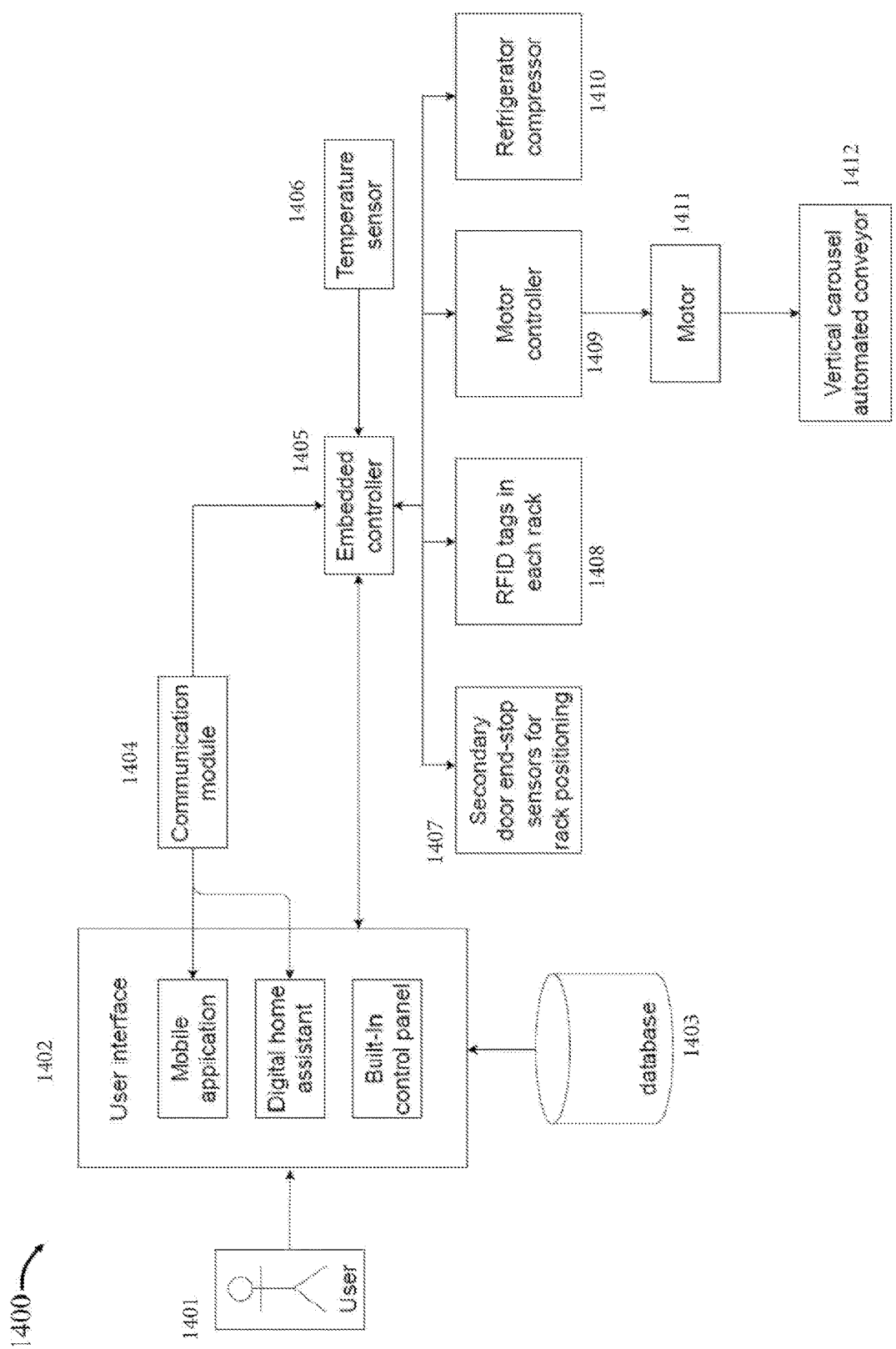
FIG. 14 is a flow process diagram illustrating the method for controlling and communicating with the smart freezer apparatus for organizing breast milk storage bags according to an embodiment of the present invention.

Subsequently, in another aspect of the invention FIG. 14 is a flow process diagram illustrating the method for controlling and communicating with the smart freezer apparatus for organizing breast milk storage bags 100. The method 1400 comprises a user 1401 who interacts with a User Interface 1402 by a mobile app, a home assistant or the built-in control panel 104 that allows access to a breast milk storage bags 601 inventory and users database 1403, a communication module 1404 enables data sharing between the User Interface devices 1402 and an embedded controller 1405 which receives lectures from a temperature sensor 1406 on the inside of the refrigerated enclosure 101, such controller also controls the end-stop sensors 1407 located on the secondary door 103 for the racks 401 proper positioning and also controls the RFID tags 1408 located in each of the racks for tracking the breast milk storage bags 601 inventory, the motor controllers 1409 and the refrigerator compressor unit 1410. Finally, the motor controllers 1409 actuates 1411 the electric motor 703 which performs the rotating movement 1412 of the vertical carousel type automated conveyor 400.

It will be apparent to one with skill in the art that the smart freezer apparatus for organizing breast milk storage bags of the invention may be provided using some of all of the mentioned features and components without departing from the spirit and scope of the present invention. It will also be apparent to the skilled artisan that the embodiments described above are specific examples of a single broader invention which may have greater scope than any of the singular descriptions taught. There may be many alternations made in the descriptions without departing from the spirit and scope of the present invention. The scope of the present invention should, therefore, be determined only by the following claims.

We claim:

1. A freezer for organizing breast milk storage bags comprising:
   a refrigerated enclosure adapted to reach freezing temperatures that further includes a compressor, an evaporator, a blowing fan, one or more temperature sensors, a controller configured to control the start and shut down of the compressor and a main insulated door that seals the refrigerated compartment;
   a vertical carousel type conveyor having two sides and a plurality of racks rotating around its vertical axis, each of the plurality of racks partitioned into a plurality of compartments adapted to receive breast milk storage bags;
   at each rack, a pivot mechanism comprising a pair of pivot hubs located offset from the center of mass on each side of the rack, an embedded scissor links assembly on each hub, and a guide link with a roller on it end is attached to the distal end of each hub;
   a drive mechanism in the vertical carousel type conveyor, the drive mechanism comprising two or more drive roller chains each comprising a plurality of chain links, wherein the scissors links are attached to chain links at a fixed distance, two or more driver sprockets connected through a shaft wherein the drive roller chains engages the two or more driver sprockets, and an electric motor assembly that drives the driver sprockets;
   a motion guide mechanism comprising a fixed track guide on both sides of the vertical carousel type conveyor adapted to engage the guide links to prevent the racks from swinging back and forth;
   a secondary insulated door comprising a drop-down mechanism adapted to provide access to the inside of the refrigerated enclosure, further including a load sensor adapted to weighing the breast milk storage bags;
   a plurality of light sources that indicates in which of the plurality of compartments a selected breast milk storage bag is located; and
   a control panel with a display adapted to provide a user interface for controlling the apparatus.

2. The freezer for organizing breast milk storage bags of claim 1, further comprising:
   an enclosure protective cover that prevents a user from reaching inside the refrigerated enclosure when the vertical carousel conveyor is rotating.

3. The freezer for organizing breast milk storage bags of claim 2, further comprising:
   one or more compartment protective covers adapted to prevent a user from reaching inside a corresponding compartments partitions.

4. The freezer for organizing breast milk storage bags of claim 3, further comprising:
   one or more processors, sensors, drivers, and controllers adapted to control the overall function of the electromechanical components of the apparatus;
   a memory adapted to store preset instructions, and a database of breast milk storage bag contents, filling date, expiration date, and/or weight;
   a communication module adapted to enable sharing of data with one or more external devices;
   the user interface for directing the one or more processors, drivers and controllers to perform breast milk storage bags retrieval or storage procedures in accordance with the preset instructions.

* * * * *